(12) United States Patent
Pakkanen

(10) Patent No.: US 11,447,346 B2
(45) Date of Patent: Sep. 20, 2022

(54) GROUPING STATION FOR GROUPING PALLETS

(71) Applicant: ACTIW OY, Naarajarvi (FI)

(72) Inventor: Jukka Pakkanen, Saynatsalo (FI)

(73) Assignee: ACTIW Oy, Naarajarvi (FI)

( * ) Notice: Subject to any disclaimer, the term of this patent is extended or adjusted under 35 U.S.C. 154(b) by 0 days.

(21) Appl. No.: 17/047,735

(22) PCT Filed: May 6, 2019

(86) PCT No.: PCT/FI2019/050350
§ 371 (c)(1),
(2) Date: Oct. 15, 2020

(87) PCT Pub. No.: WO2019/211525
PCT Pub. Date: Nov. 7, 2019

(65) Prior Publication Data
US 2021/0155413 A1    May 27, 2021

(30) Foreign Application Priority Data

May 4, 2018    (FI) ..................................... 20185415

(51) Int. Cl.
*B65G 47/08* (2006.01)
*B65G 47/54* (2006.01)
*B65B 35/44* (2006.01)
*B65G 47/56* (2006.01)

(52) U.S. Cl.
CPC .......... *B65G 47/086* (2013.01); *B65G 47/54* (2013.01); *B65B 35/44* (2013.01); *B65G 47/082* (2013.01); *B65G 47/56* (2013.01); *B65G 2201/0267* (2013.01)

(58) Field of Classification Search
CPC .... B65G 47/086; B65G 47/54; B65G 47/082; B65G 47/56; B65G 13/075; B65B 35/44
See application file for complete search history.

(56) References Cited

U.S. PATENT DOCUMENTS

| | | | |
|---|---|---|---|
| 2,062,604 A * | 12/1936 | Paxton | B65G 47/54 193/36 |
| 3,195,710 A | 7/1965 | Robinson | |
| 3,239,054 A | 3/1966 | Eliassen | |
| 3,265,186 A * | 8/1966 | Burton | B65G 47/54 198/361 |
| 6,186,724 B1 | 2/2001 | Hollander | |

(Continued)

FOREIGN PATENT DOCUMENTS

| CN | 104401633 | 3/2015 |
|---|---|---|
| CN | 104609198 | 5/2015 |

(Continued)

OTHER PUBLICATIONS

Finnish Patent Office Search Report, Finnish Application No. 20185415, dated Nov. 28, 2018.

(Continued)

*Primary Examiner* — William R Harp
(74) *Attorney, Agent, or Firm* — Fildes & Outland, P.C.

(57) ABSTRACT

A grouping station for grouping pallets includes an inbound conveyor, which is a gravity conveyor. The grouping station includes a fixed-height pairing conveyor and a grouping conveyor with three height positions for different grouping functions.

9 Claims, 5 Drawing Sheets

(56) References Cited

U.S. PATENT DOCUMENTS

| | | |
|---|---|---|
| 6,789,660 B1 | 9/2004 | Bruun et al. |
| 2006/0070847 A1 | 4/2006 | Besch et al. |
| 2017/0312789 A1 | 11/2017 | Schroader |

FOREIGN PATENT DOCUMENTS

| | | |
|---|---|---|
| CN | 105314380 | 2/2016 |
| DE | 2606467 | 8/1977 |
| EP | 0438667 | 7/1991 |
| ES | 2171353 | 9/2002 |
| FR | 1142619 | 9/1957 |
| GB | 801623 | 9/1958 |
| JP | S5414393 | 6/1979 |
| JP | H04341416 | 11/1992 |
| WO | 2008019733 | 2/2008 |

OTHER PUBLICATIONS

International Search Report, International Application No. PCT/FI2019/050350, dated Sep. 2, 2019.

Chinese Office Action in corresponding Chinese Application No. 201980030150.8, dated Jul. 21, 2021 and English language translation.

Supplementary European Search Report in corresponding European patent application No. 19795919 dated Dec. 21, 2021.

Chinese Office Action in corresponding Chinese Application No. 201980030150.8, dated Mar. 9, 2022 and English language translation.

* cited by examiner

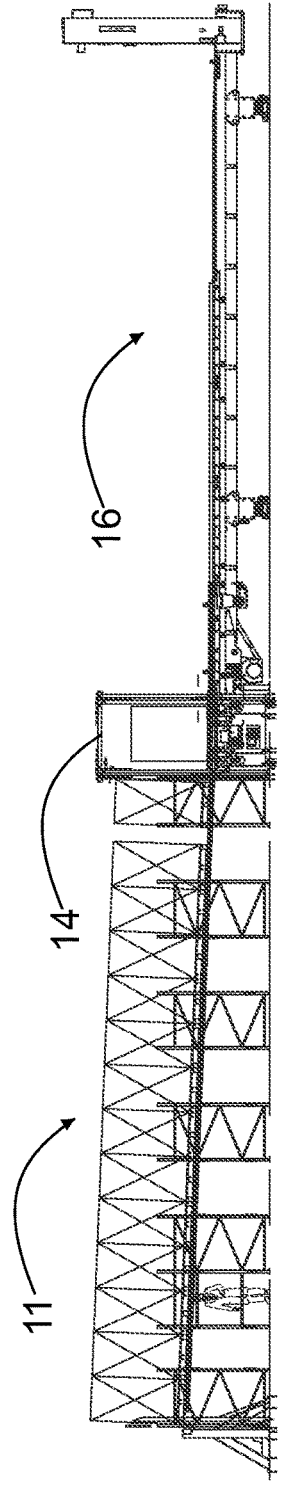
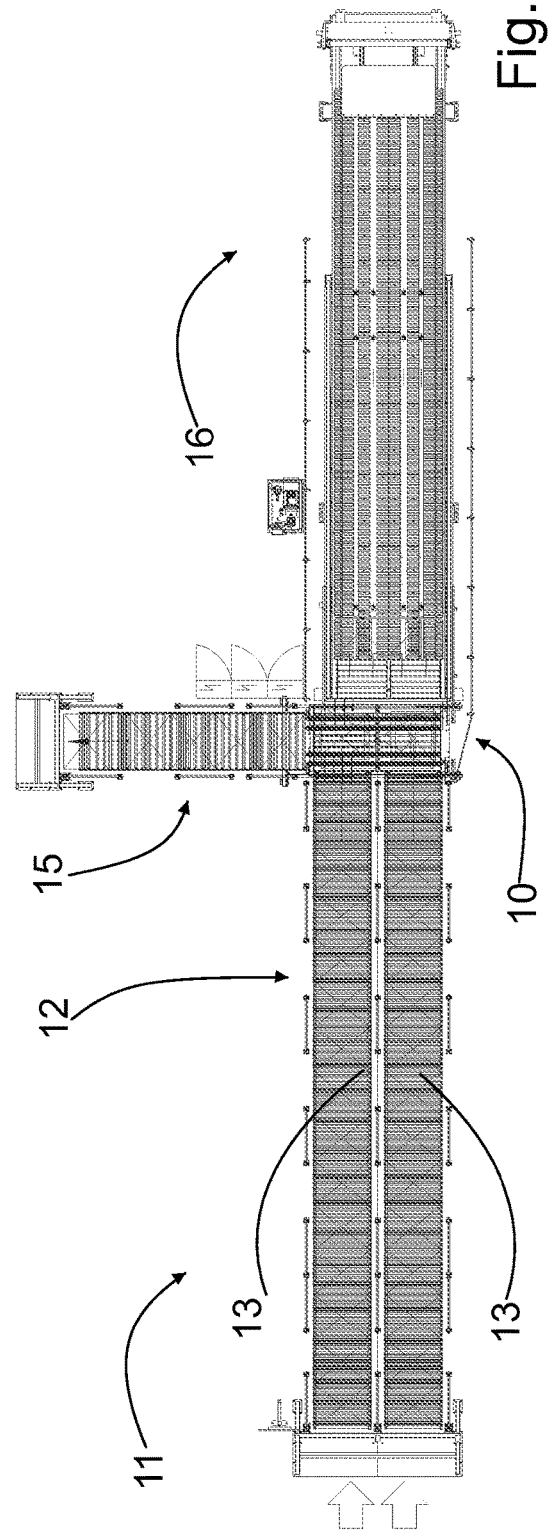
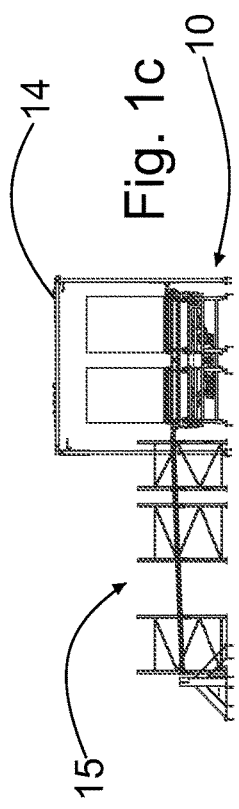

1 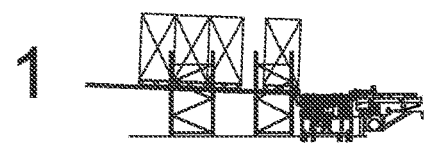
2 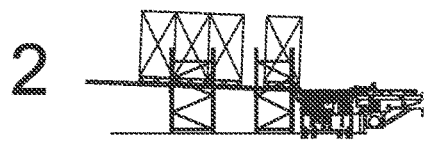
3 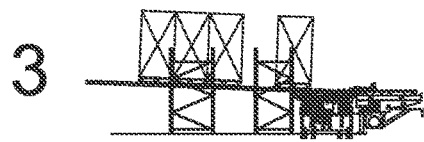
4 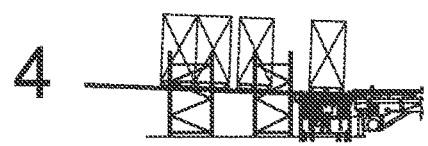
5 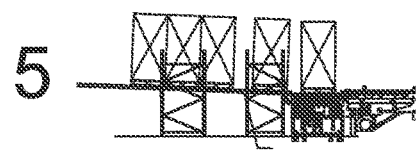
6 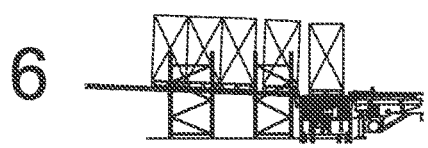
7 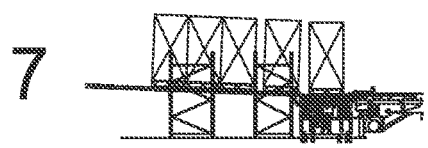
Fig. 4

GROUPING STATION FOR GROUPING PALLETS

CROSS-REFERENCE TO RELATED APPLICATIONS

This application claims benefit of priority from International Patent Application No. PCT/FI2019/050350 filed May 6, 2019, which claims benefit of priority from Finland Patent Application No. 20185415 filed May 4, 2018, both of which are incorporated by reference in their entirety.

FIELD OF THE INVENTION

The invention relates to a grouping station for grouping pallets, which grouping station includes an inbound conveyor, which is a gravity conveyor.

BACKGROUND OF THE INVENTION

There are grouping stations that combine and align pallets to be loaded in a cargo space like a trailer or container. The pallets are moved to the grouping station by an inbound conveyor having a different kind of drives like gear motors, for example.

GB801623 discloses a machine for handling packages. The machine includes a conveyor of a roller type.

SUMMARY OF THE INVENTION

The invention is intended to create a new kind of grouping station, which costs less than before, but is also more comprehensive in use. According to the present invention the grouping station for grouping pallets, includes an inbound conveyor which is a gravity conveyor, and the grouping station also includes two additional conveyors; one with fixed-height and another with three height positions. The fixed-height conveyor is a pairing conveyor arranged to pair pallets side by side and the other conveyor is a grouping conveyor with three height positions for different grouping functions and arranged to receive the pallets from an inbound conveyor to the grouping station and to transfer the paired pallets forward, wherein the first position is a low-position where the grouping conveyor is lower than the pairing conveyor, the second position is a middle-position where the grouping conveyor is horizontally disposed and above the pairing conveyor, and the third position is an up-position where the grouping conveyor is inclined according to the gravity conveyor. In the grouping station according to the invention, few and simple components are used, by means of a surprising combination of which the grouping station is made more efficient but nevertheless lower in cost than previously.

BRIEF DESCRIPTION OF THE DRAWINGS

In the following, the invention is described in detail with reference to the accompanying drawings showing one embodiment of the invention, in which FIG. 1a shows a side view of the layout of the system according to the invention, FIG. 1b shows a top view of the layout of the system according to the invention, FIG. 1c shows a front view of the layout of the system according to the invention, FIG. 4 shows the functionality of the grouping station according to the invention step by step.

DETAILED DESCRIPTION OF THE INVENTION

FIGS. 1a-1c shows an overview of the grouping station 10 according to the present invention. The grouping station 10 includes an inbound conveyor 11, which is a gravity conveyor 12. Here the gravity conveyor 12 includes two adjacent gravity lanes 13. There could also be only one lane or even three lanes. Each gravity lane includes several free rotating rollers.

Figure 2:
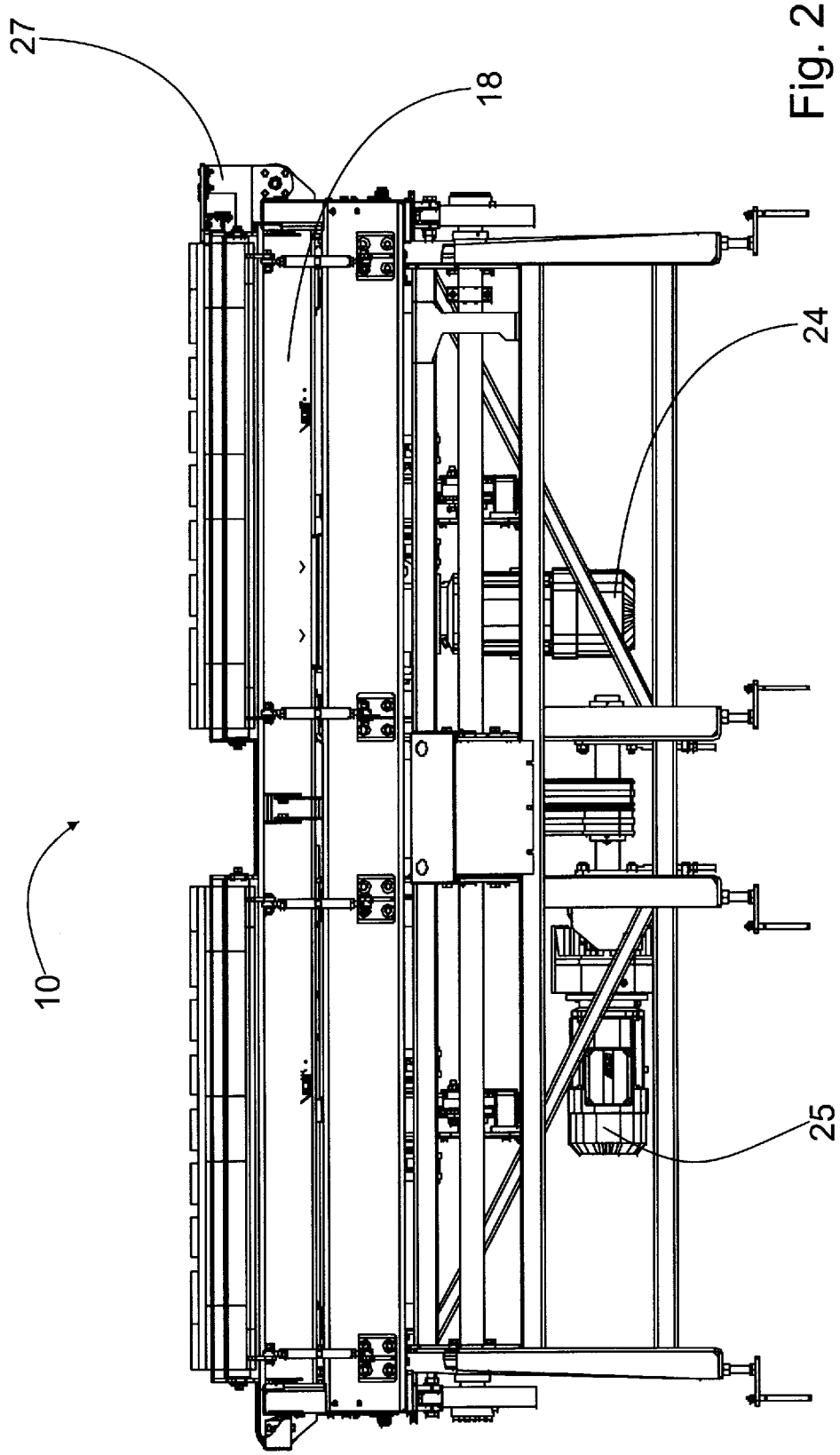
FIG. 2 shows a front view of the grouping station according to the invention.
Figure 3:
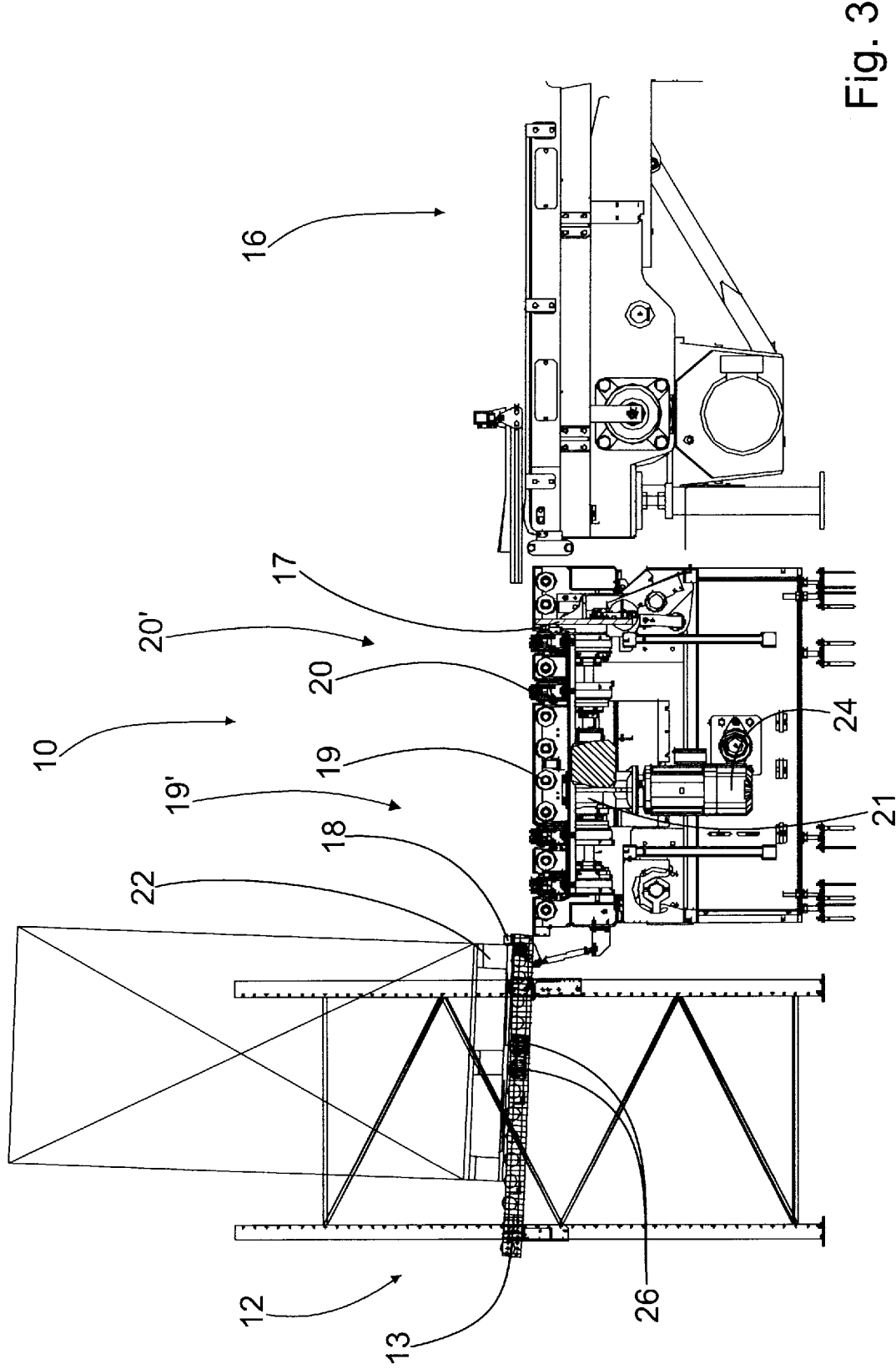
FIG. 3 shows a side view of the grouping station according to the invention.

Here the pallet type is 1200×1000 mm timber pallet or similar. When gravity lanes formed of rollers are used, the pallet preferably has longitudinal bottom skids. One of this kind of pallet is known as CHEP. If there is no longitudinal bottom skids, the rollers are more densely. A pallet 22 with goods is shown in FIG. 3.

The inbound conveyor buffers pallets. Here the inbound conveyor consists of two parallel gravity lanes both having a capacity of eleven pallets. The pallets are moved to the gravity lanes by a forklift truck, for example.

According to the invention, the grouping station 10 includes a fixed-height pairing conveyor 20'. The grouping station 10 also includes a grouping conveyor 19' with three height positions for different grouping functions. The function of the different conveyors are explained later in detail. In the shown embodiment, the fixed-height pairing conveyor 20' and the grouping conveyor 19' are perpendicular with each other. In addition, the said conveyors are overlapping each other. Then the grouping station is very compact. Here the fixed-height pairing conveyor 20' is a chain conveyor 20. The chain conveyor extends over the width of the grouping station. Here the grouping conveyor 19' is a roller conveyor 19. Actually, there are two parallel roller conveyors, one for each gravity lane. The grouping station 10 includes two drives, one drive 24 for the pairing conveyor 20' and one drive 25 for a lifter 21 lifting the grouping conveyor 19'.

The grouping station combines a chain conveyor, two roller conveyors, a raising mechanical stopper and lifting units. For different functions, the grouping station has several simple drives for a right side roller conveyor, a left side roller conveyor, a chain conveyor and a lifter. In minimum, there is only four drives.

The gravity lanes have two separation functions. The first function is separating first pallets from the rest of the buffered pallets and the second function is for holding or separating the first pallets from the grouping station. The gravity lanes release a new set of pallets to grouping station when it is available for a new set.

The pallets may be loaded two different ways, the short or the long side leading. When two gravity lines are used, the orientation of the pallets would be as following; two short sides leading, two long sides leading and one short side and one long side leading.

The gravity lane is used to buffer the pallets during the loading sequence. Here the grouping station is followed by a loading equipment 16 utilizing a transfer plate. The transfer plate can carry about twelve pallets in a row.

Thereby when loading equipment is in action, the next load may be buffered on the gravity lanes.

Here the grouping station is used to pair pallets together before they are transferred to the loading equipment. The grouping station can handle two and one pallet rows. A row with one pallet is centered to the grouping station. The grouping station is a right-angled transfer system with a contour check device 14. The contour check device is for checking the pallet row profile that it fits into the container, trailer or truck loaded by the loading equipment. The contour check device can be a known optical profile inspection unit or similar. Here the system also includes a gravity reject conveyor 15, left or right hand side, capable to buffer two pallet in pairs for corrective measures. If the contour, size or shape of the pallet with the goods on it is faulty, the pallet in question is guided to the gravity reject conveyor 15 for corrective measures. Only correct pallets are accepted and moved forward. The pallets are transferred to grouping station from two inbound buffer gravity lanes.

The grouping station, more specifically the grouping conveyor has three main positions. The first is an up-position. Here the grouping station and its roller conveyor 19 is matching its inclination with the gravity conveyor. The inclination is about two decrees. In a middle-position, the pallets are moved against the pop-up-stopper. In FIG. 3, the pop-up stopper 17 is in a low-position. Here the pallets are aligned and then moved to the loading equipment. In a low-position the chain conveyor 20 is acting. The chain conveyor groups the pallets against side stopper 27 and removes a gap between the pallets or centralize the single pallet to the middle or rejects the pallets to reject gravity lane.

After the first pallet have entered to the grouping station, the grouping station is lowered to middle position to raise an end stopper 18 to lower end of the gravity lane 13. In the middle and low-positions, the end stopper is holding the next pallet pair on the gravity lanes on its place until the grouping station is free to take the next pallets. This end stopper releases the next pallets in the up-position of the grouping conveyor.

The reject conveyor is used to reject pallets from the grouping station. Only the pallet pairs within design limits for the chosen loading pattern are transferred further to the loading equipment. Over-sized sets shall be transferred to the reject lane, capable to buffer two pallet pairs for corrective measures. If there are pallets rejected from the dedicated load, load forming will wait for equivalent quantity and same formation of replacement pallets to be fed to the system.

Next, in FIG. 4, the function of the grouping station are explained in seven steps.

STEP 1: A queue of pallets standing on the gravity lanes behind the second pallets. The first pallets stand behind the end stopper. The pivoted end stopper is in up-position when the roller conveyor of the grouping station is in down-position.

There is also a pallet separator in the gravity lane. The pallet separator is actuated by first pallets standing at the end of the gravity lane and prevents the second pallets to roll down and keeps a gap between the first and next pallets. When the first pallets are moved away from their position on the gravity lane, the pallet separator opens and releases the queued pallets to move. Here the queue of pallets is standing on the gravity lanes and the roller conveyor is in low-position.

STEP 2: The roller conveyor is in mid-position and the pivoting end stopper is going down.

STEP 3: The first pallets have started to move from behind the end stopper. The end stopper has pivoted down and released the pallets behind it. The roller conveyor of the grouping station is in up-position and the end stopper is down. Then the first pallets are entering the grouping station by gravity.

STEP 4: The queue of pallets are standing on the gravity lanes behind the second pallets have also started to move, but slower than the second pallets, due to brake rollers on gravity lane. In other words, the gravity conveyor includes a pallet separator formed of brake rollers 26. The end stopper has pivoted down and released the pallets behind it. There is a pop-up-stopper in up-position preventing the pallets to go further and aligning the pallets straight. Now the roller conveyor is still in up-position and the first pallet pair arrives against pop-up-stopper and gets aligned straight.

STEP 5: The second pallets are moving down on the gravity lanes, but have not yet reached the end stopper. The first pallets are standing on the roller conveyor whilst the roller conveyor is going down. The end stopper has pivoted up again preventing the next pallets to roll over to the grouping station. The pallet separator is released from under the second pallets and will stop the pallet queue behind the second pallet already at the separator. The roller conveyor is going down, whilst the first pallet pair is resting on roller conveyor horizontally.

STEP 6: Here the second pallets have reached the end stopper and are standing behind it. The first pallets are standing on the chain conveyor and are being grouped together against mechanical side stopper. The end stopper is now up and it prevents the next pallets to roll over to grouping station. The roller conveyor is down and the first pallet pair is resting on chain conveyor and then driven and packed sideways together against side stopper. After the pairing movement against the mechanical side stopper, the pallet pair is driven back with the chain conveyor to the centerline of the loading equipment.

STEP 7: The second pallets have reached the end stopper and are standing behind it. The first pallets are standing on the roller conveyor and are being conveyed horizontally over to the loading equipment. The end stopper is now up and it prevents the next pallets to roll over to the grouping station. The roller conveyor of the grouping station is lifted up to mid-position, whilst the first pallet pair travels horizontally over to the loading equipment.

Figure 5A:
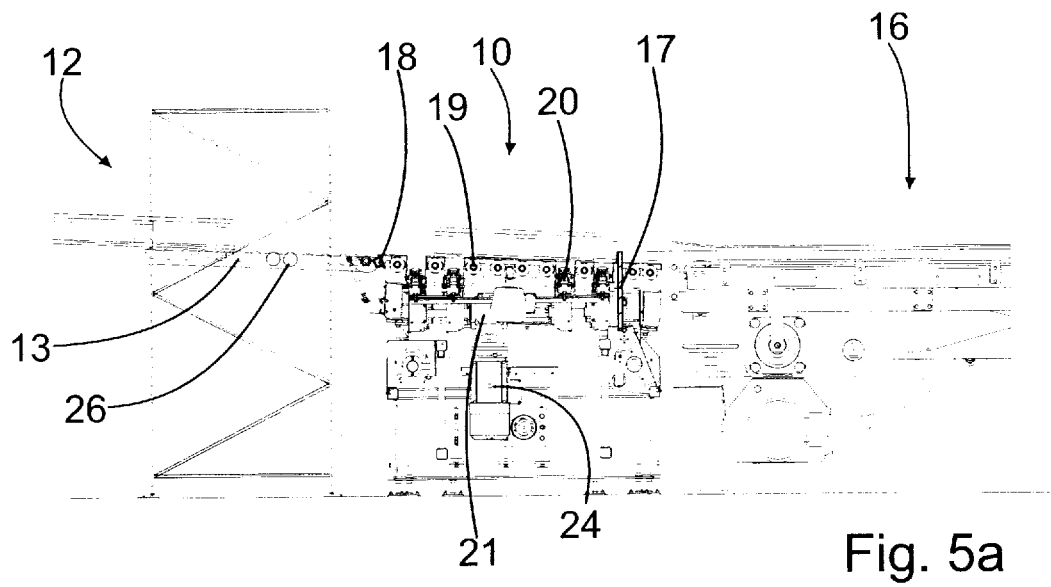
FIG. 5a shows a grouping conveyor in up-position.
Figure 5B:
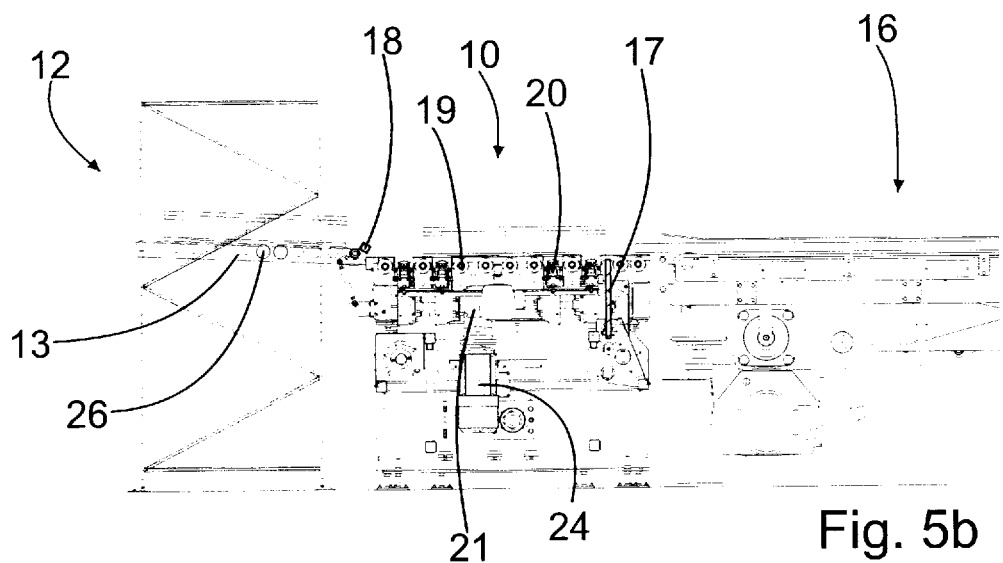
FIG. 5b shows the grouping conveyor of FIG. 5a in middle-position.
Figure 5C:
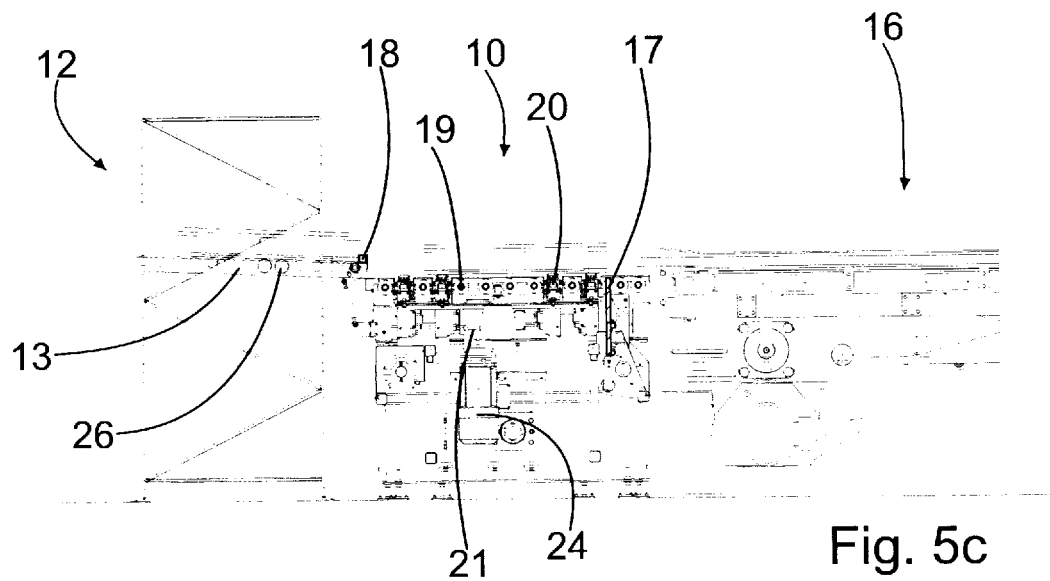
FIG. 5c shows the grouping conveyor of FIG. 5a in low-position.

FIGS. 5*a*-5*c* show the three positions of the grouping station according to the invention. Here only the pallets are shown, but in reality, goods like packages or bags are loaded on the pallets. In FIG. 5*a*, the roller conveyor 19 is in up-position and the pallet pair arrived against pop-up stopper 17 and gets aligned straight.

In FIG. 5*b*, the roller conveyor 19 and pop-up stopper 17 are going down and the pallet pair is resting horizontally on roller conveyor 19. Simultaneously the end stopper 18 is get-ting up. The end stopper is linked to the roller conveyor. Then no separate actuator is needed and the movement of the end stopper is synchronized with the movement of the roller conveyor.

In FIG. 5*c*, the roller conveyor 19 is down and the pallet pair is resting on the chain conveyor 20. By the chain conveyor the pallets of the pallet pair are packed sideways together against side stopper. After paring the pallet pair is centered. If necessary, any faulty pallet is driven to the reject conveyor. After paring and centering, the roller conveyor is raised in the middle-position and the pallet pair is driven by the roller conveyor to the loading equipment.

The invention claimed is:

1. Grouping station for grouping pallets, comprising an inbound conveyor including two parallel gravity lanes for buffering pallets, which is a gravity conveyor, a pairing conveyor adjacent the inbound conveyor, which is a fixed height chain conveyor including a side stopper against which two or three pallets are drivingly packed side by side together against the side stopper, and a grouping conveyor disposed perpendicular to the pairing conveyor and overlapping the pairing conveyor, the grouping conveyor providing three height positions for different grouping functions and arranged to receive the paired pallets from the inbound conveyor and to transfer paired pallets forward, wherein the first position is a low-position where the grouping conveyor is lower than the pairing conveyor, the second position is a middle-position where the grouping conveyor is horizontal and above the pairing conveyor, and the third position is an up-position where the grouping conveyor is inclined according to the gravity conveyor.

2. Grouping station according to claim 1, wherein the grouping conveyor is a roller conveyor.

3. Grouping station according to claim 1, wherein the gravity conveyor includes three parallel gravity lanes.

4. Grouping station according to claim 1, wherein the gravity conveyor includes an end stopper for stopping and releasing pallets to the grouping conveyor, which end stopper is linked to the grouping conveyor.

5. Grouping station according to the claim 4, wherein the end stopper is pivoted down when the grouping conveyor is in the up-position and is pivoted up when the grouping conveyor is in the down-position.

6. Grouping station according to claim 1, wherein the grouping station includes two drives, one drive for the pairing conveyor and one drive for a lifter lifting the grouping conveyor.

7. Grouping station according to claim 1, wherein the grouping station includes a pop-up stopper for aligning the pallets.

8. Grouping station according to claim 1, wherein the grouping station includes a gravity reject conveyor connected to the pairing conveyor for rejecting faulty pallets.

9. Grouping station according to claim 1, wherein the gravity conveyor includes a pallet separator formed of brake rollers.

* * * * *